US012755582B2

(12) United States Patent
Hashimoto et al.

(10) Patent No.: US 12,755,582 B2
(45) Date of Patent: Oct. 6, 2026

(54) ON-DEMAND DATA RETRIEVAL SYSTEM AND METHOD OF USING

(71) Applicant: Woven by Toyota, Inc., Tokyo (JP)

(72) Inventors: Daisuke Hashimoto, Chofu (JP); Marc Carre, Tokyo-to (JP); Mario Freitas, Tokyo-to (JP); Samira Emmerson, Tokyo-to (JP); Phat Nguyen, Tokyo-to (JP); Kerli Low, Tokyo-to (JP); Laurent Fert, Yokohama (JP); Takeshi Sekiya, Kawasaki (JP); Kevin Irwin, Cedar Park, TX (US)

(73) Assignee: WOVEN BY TOYOTA, INC., Tokyo (JP)

( * ) Notice: Subject to any disclaimer, the term of this patent is extended or adjusted under 35 U.S.C. 154(b) by 317 days.

(21) Appl. No.: 17/497,989

(22) Filed: Oct. 11, 2021

(65) Prior Publication Data

US 2023/0114690 A1 Apr. 13, 2023

(51) Int. Cl.

| | |
|---|---|
| ***G07C 5/00*** | (2006.01) |
| ***G06F 16/23*** | (2019.01) |
| ***G06F 16/332*** | (2025.01) |

(52) U.S. Cl.

CPC ......... *G07C 5/008* (2013.01); *G06F 16/2358* (2019.01); *G06F 16/3323* (2019.01)

(58) Field of Classification Search

CPC .................. G07C 5/008; G07C 5/0816; G07C 5/0841–0891; G07C 5/12; G06F 16/3323; G06F 16/2358; G06F 16/144; G06F 16/156

See application file for complete search history.

(56) References Cited

U.S. PATENT DOCUMENTS

| | | | | |
|---|---|---|---|---|
| 8,751,100 | B2 * | 6/2014 | Johnson | G06F 11/0757 700/32 |
| 9,818,237 | B2 * | 11/2017 | Iyoda | H04L 67/12 |
| 9,870,656 | B2 * | 1/2018 | Katta | G07C 5/085 |
| 10,140,114 | B2 * | 11/2018 | Nogueira-Nine | G06F 8/65 |
| 10,311,728 | B2 * | 6/2019 | Stenneth | H04L 63/123 |
| 10,838,888 | B2 * | 11/2020 | Murata | G07C 5/008 |

(Continued)

FOREIGN PATENT DOCUMENTS

| | | |
|---|---|---|
| JP | 2017-069917 A | 4/2017 |
| JP | 2020-027413 A | 2/2020 |

(Continued)

*Primary Examiner* — Benjamin Smith

(74) *Attorney, Agent, or Firm* — HAUPTMAN HAM. LLP

(57) ABSTRACT

A system includes a non-transitory computer readable medium configured to store instructions thereon; and a processor connected to the non-transitory computer readable medium. The processor is configured to execute the instructions for receiving information from a user interface (UI) for a data request; and assigning identification information to the data request. The processor is further configured to execute the instructions for storing the data request in association with the identification information. The processor is further configured to execute the instructions for transmitting the data request to a vehicle. The processor is further configured to execute the instructions for receiving data from a source the vehicle in response to the transmitted data request; and notifying a user of the received data.

20 Claims, 7 Drawing Sheets

(56) References Cited

U.S. PATENT DOCUMENTS

| | | | | |
|---|---|---|---|---|
| 11,030,068 | B1 | 6/2021 | Agarwal et al. | |
| 11,165,651 | B2 * | 11/2021 | Fang | H04W 4/40 |
| 11,228,496 | B2 * | 1/2022 | Fang | H04W 12/088 |
| 2005/0080606 | A1 * | 4/2005 | Ampunan | G08G 1/20 703/8 |
| 2006/0229777 | A1 * | 10/2006 | Hudson | G05B 23/021 701/31.4 |
| 2009/0216733 | A1 * | 8/2009 | Carter | G06F 16/9537 707/999.005 |
| 2012/0041638 | A1 * | 2/2012 | Johnson | G06F 11/3003 701/33.1 |
| 2014/0121891 | A1 * | 5/2014 | Barrett | H04L 67/12 701/33.2 |
| 2016/0364921 | A1 * | 12/2016 | Iyoda | H04L 67/52 |
| 2017/0161973 | A1 | 6/2017 | Katta et al. | |
| 2017/0232982 | A1 * | 8/2017 | Itakura | B61L 25/021 701/33.4 |
| 2018/0024828 | A1 * | 1/2018 | Nogueira-Nine | H04L 67/34 717/173 |
| 2018/0300966 | A1 * | 10/2018 | Zoller | H04L 67/125 |
| 2018/0302189 | A1 * | 10/2018 | Harrod, IV | H04L 43/16 |
| 2019/0050354 | A1 * | 2/2019 | Murata | G06F 13/20 |
| 2020/0076895 | A1 | 3/2020 | Tsuyunashi et al. | |
| 2020/0077292 | A1 * | 3/2020 | Tsuyunashi | H04W 4/44 |
| 2020/0202645 | A1 * | 6/2020 | Gintz | G07C 5/0825 |
| 2020/0369295 | A1 * | 11/2020 | Yang | B60W 60/0059 |
| 2021/0092018 | A1 * | 3/2021 | Fang | H04L 63/0236 |
| 2021/0092019 | A1 * | 3/2021 | Fang | H04W 4/40 |
| 2021/0105325 | A1 | 4/2021 | Tsuyunashi et al. | |
| 2021/0312724 | A1 * | 10/2021 | Petri | H04W 4/40 |
| 2021/0370960 | A1 * | 12/2021 | Autran | G07C 5/008 |
| 2023/0406330 | A1 * | 12/2023 | Woodbury | B60W 50/14 |
| 2024/0027541 | A1 * | 1/2024 | Kato | G01R 31/40 |
| 2024/0053738 | A1 * | 2/2024 | Wang | B60W 50/0205 |
| 2024/0176755 | A1 * | 5/2024 | Uematsu | H04L 67/12 |

FOREIGN PATENT DOCUMENTS

| | | | |
|---|---|---|---|
| JP | 2020-038408 | A | 3/2020 |
| JP | 2020-187536 | A | 11/2020 |
| JP | 2021-056961 | A | 4/2021 |

* cited by examiner

ON-DEMAND DATA RETRIEVAL SYSTEM AND METHOD OF USING

BACKGROUND

As connectivity between different products increases, software developers seek to develop new applications for allowing users to customize experiences with different products. In order to develop the applications, software developers rely on data structures within the product in order to develop an application which operates reliably on the product. In some instances, application program interfaces (API) help to permit applications to exchange data with a product without specifically tailoring the application to the product. However, in some instances, understanding types of data available within the product and the format of that data helps software developers to enhance the application to improve a product user experience.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
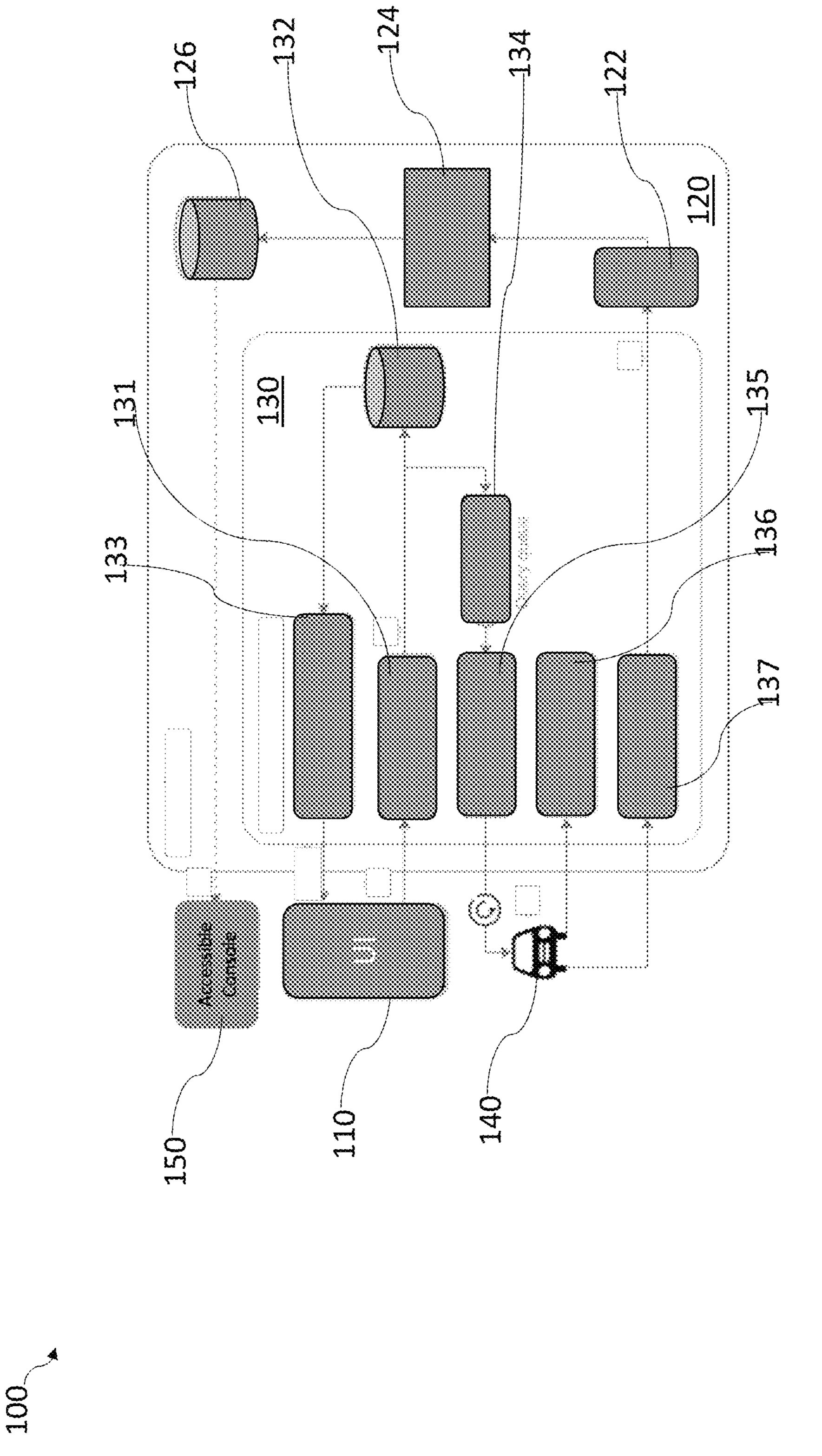
FIG. 1 is a schematic diagram of an on-demand data retrieval (ODDR) system in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A user, such as a software developer, an insurance provider, a market researcher and a law enforcement, is able to use an on-demand data retrieval (ODDR) system to enter a data request into a user interface, such as a graphical user interface (GUI). The software developer is a software developer who develops applications, middleware or OS (operating systems) to be run on the vehicle, for example. Example applications includes automated-driving system applications such as an object recognition application, a road recognition application, a sensor fusion application, a localization application, path planner application, controller application, etc. The data request is analyzed and stored in a server and then transmitted to a vehicle by the server. On the server side, the data requests are stored in a storage unit in and a request queue is generated based on the stored requests. The user is able to see or request updates on a status of the data request. For example, while the data request is still within the server prior to transmission to the vehicle, the status may be indicated as "pending." Once the server transmits the data request to the vehicle, the status may be updated to "submitted." This allows the user to see and track the status of data requests made to the vehicle. One of ordinary skill in the art would recognize that the description refers to a vehicle for the sake of clarity; however, the description is applicable to groups of vehicles in addition to a single vehicle.

The user interface for generating the data request includes forms related to vehicle identifying information, data types being requested, start time and end time. In some embodiments, the start time and the end time are absolute times, such as Unix time, that is an elapsed time since a Unix epoch time. In some embodiments, the start time and the end time are relative times to the time that the data request is received by the vehicle. In some embodiments, the start time and the end time are relative times to a trigger event. The trigger event is the occurrence within the vehicle or in the environment surrounding the vehicle about which the user is seeking data or receipt of a data request by the vehicle. For example, a trigger event resulting from an environment surrounding the vehicle includes sudden acceleration, sudden braking, capturing an image of a target of a data request, detecting of a target of a data request or other suitable occurrences. The user information for monitoring a status of data requests includes identifying information of the data request and a status of the data request, such as pending or submitted.

In some embodiments, once the data request is received by the vehicle, the data request is processed to make the data request agnostic as to the source of the data request. In some embodiments, a data request identification (ID) is assigned to the received data request by the vehicle, for example by a request abstractor in the vehicle. In some embodiments, the data request ID is assigned to the data request prior to transmission of the data request to the vehicle. In some embodiments, a data request is generated by an application running in the vehicle and the application assigns the data request ID. In other words, the data is processed in a consistent manner regardless of a program or system that transmits the data request to the vehicle. In some embodiments, a data request is generated by a software component stored within the vehicle, and the data is processed in consistent with a data request received from an external device. This helps to sharing the same data collection software components among trigger data collection, where an application generates a data collection request to the logger, and the ODDR-based external data collection request.

In some embodiments, once the data request is received by the vehicle, the data request is processed to make the data request agnostic to the sensors within the vehicle and the server. In some embodiments, the data request is generated by an application running in the vehicle. In some embodiments, an application programming interface (API) is usable to make the data request from the application agnostic to the sensors within the vehicle or information from the server. This helps to maximize the user's ability to collect data without programming a request for specific sensor models. The data request is then transferred to a data collector and the requested data is collected in response to occurrence of the trigger event. In the situation where the trigger event had already occurred, such as a traffic accident, the data request is fulfilled based on data stored within a storage device within the vehicle. A time frame, i.e., start and end times, of the collected data is determined based on the data request. The collected data is transferred back to the server.

The collected data is then stored in the server and a notification is sent to the user regarding completion of the data request. For example, the status of the data request is updated to "complete" on the user interface.

In some instances, a budget management system or a payment system is implemented on the server side or vehicle side, such that the user is charged a fee for a data request. The fee is payable either at the submission of the request or at completion of data collection. The fee is adjustable based on the type and amount of data requested. In some embodiments, when the total amount of fee that is charged to the user reaches a maximum threshold of user's budget, the data request from the user is rejected.

This ODDR system allows users to access information collected by vehicle in an on-demand style. That is, the data is not necessarily continuously collected, but could be collected to satisfy specific desires of a user. In some embodiments, the ODDR system helps users, such as software developers, collecting data to update the design, implementation and parameter tuning of their software in an exploratory way based on collected data so that the users are able to continuously improve the software by delivering updates from the server to the vehicle via network, for example, as an Over-the-Air (OTA) update. In some embodiments, the ODDR system helps machine learning developers who develops machine learning model for the applications collecting data to train the model with the data which was not available when the model was initially developed so that the machine learning developers are able to update the models to fix weakness and issues of the model continuously. In some instances, an insurance provider would be able collect data related to a traffic accident. In some instances, law enforcement would be able to collect information related to a crime or a traffic accident.

FIG. 1 is a schematic diagram of an on-demand data retrieval (ODDR) system 100 in accordance with some embodiments. The ODDR system 100 includes a user interface (UI) 110. The UI 110 is configured to receive a user request for data from a vehicle 140. The ODDR system 100 further includes a server 120 configured to receive the user request from the UI 110; transmit the user request to the vehicle 140; receive data from the vehicle 140; and provide the data to the user via an accessible console 150. The server 120 includes a communication section 130 for communicating with the UI 110 and the vehicle 140. The ODDR system 100 further includes an accessible console 150 configured to communicate data collected from the vehicle 140 to the user.

The UI 110 is configured to receive input instructions from the user. In some embodiments, the user includes a software developer. In some embodiments, the user includes a machine learning model developer. In some embodiments, the user includes an insurance provider. In some embodiments, the user includes law enforcement. In some embodiments, the user includes market research company. The UI 110 provides options for the user to select what type of vehicle and what type of data is being requested. In some embodiments, the UI 110 is capable of generating the data request using forms related to vehicle identifying information, data types being requested, start time and end time. In some embodiments, the start time and the end time are absolute times, such as Unix time, that is an elapsed time since a Unix epoch time. In some embodiments, the start time and the end time are relative times to the time that the data request is received by the vehicle. In some embodiments, the start time and the end time are relative times to a trigger event. In some embodiments, the UI 110 also provides the user with options for selecting a trigger event and a data collection duration relative to the trigger event. In some embodiments, the UI 110 includes information related to a type of vehicle from which data is requested. In some embodiments, the UI 110 includes vehicle ID which can uniquely identify a vehicle in the world. For example, the vehicle ID includes an universally unique identifier (UUID) format. In some embodiments, the UI 110 includes data type that is able to identify the source of the data that user want to collect. For example, the data type includes sensor ID of sensor that sensor data is collected from, application ID of application that application log is collected from. In some embodiment, the format of the sensor ID and application ID includes an universally unique identifier (UUID) format. In some embodiments, the UI 110 includes drop down menus. In some embodiments, the UI 110 includes editable fields for receiving information related to a data request. In some embodiments, the UI 110 provides information regarding what data option types are available to the user. In some embodiments, the data option types available depend on the user. For example, law enforcement is able to select more data options than an insurance provider in some embodiments.

In some embodiments, the UI 110 includes a graphical user interface (GUI). In some embodiments, the UI 110 is includes a mobile terminal, such as a mobile telephone, connectable to the server 120. In some embodiments, the UI 110 includes a web interface such as RESTful API. In some embodiments, the UI 110 includes a computer connectable to the server 120. In some embodiments, the UI 110 is capable of wireless connection to the server 120. In some embodiments, the UI is connectable to the server 120 by a wired connection. The UI 110 is also able to provide the user with updates regarding a status of a data request. In some embodiments, the UI 110 provides status updates regarding a data request in response to an additional query by the user. In some embodiments, the UI 110 provides status updates regarding a data request upon receipt of updated information from the server 120 automatically without user interaction. In some embodiments, the status update causes the UI 110 to trigger an alert for the user. In some embodiments, the alert includes an audio or visual alert.

In some embodiments, the UI 110 includes a means for accepting payment of a fee from the user. In some embodiments, the UI 110 includes data entry fields to permit the user to enter payment card information. In some embodiments, the UI 110 includes a reader for detecting payment card information, such as a magnetic stripe reader, a bar code reader, a chip reader, or another suitable reader.

The server 120 includes a communication section 130 configured to communicate with the UI 110 and the vehicle 140. The communication section 130 includes a receiver 131 configured to receive data requests from the UI 110. In some embodiments, the receiver 131 includes a wireless receiver. In some embodiments, the receiver is configured to receive the data requests via a wired connection. In some embodiments, the receiver 131 is further configured to perform initial processing on the received data request. In some embodiments, the received data request includes priority level information. In some embodiments, the receiver 131 is configured to assign a priority level to the data request based on an identity of the user that submitted the data request and/or a fee paid by the user that submitted the data request. In some embodiments, the receiver 131 is configured to assign a request identification (ID) number to each received data request. In some embodiments, the server 120 is configured to limit access to certain sensors within the vehicle 140 based on an identity the user. For example, a third-party user will not be able to access sensor related to safety functions of the vehicle 140 in some embodiments.

The communication section 130 further includes a memory unit 132 configured to store data requests received by the receiver 131. In some embodiments, the memory unit 132 includes a random access memory, a solid state memory, or another type of memory. In some embodiments, the memory unit 132 is configured to store the data requests along with a status of the data request. In some embodiments, the status of the data request includes pending (prior to transmission of the data request to the vehicle 140); submitted (following transmission of the data request to the vehicle 140); and completed (following receipt of the requested data from the vehicle 140). In some embodiments, the memory unit 132 is accessible by the user. In some embodiments, updates to information in the memory unit 132 trigger notifications of a user associated with the information updated in the memory unit 132. In some embodiments, the memory unit 132 stores data requests in conjunction with time stamp data indicating a time at which the data request was received. In some embodiments, the memory unit 132 stores data requests in association with a priority level. In some embodiments, the priority level is determined based on an identity of the user. For example, in some embodiments, law enforcement has higher priority than an insurance provider, which has higher priority than a normal user, such as a software developer. In some embodiments, the priority level is determined based on a fee paid by the user. For example, in some embodiments, a user is able to pay a fee in order to increase a priority level of their request in order to obtain the requested data sooner. In some embodiments, the priority level of a data request is increased as an amount of time between initial storage of the data request and transmission of the data request to the vehicle increases.

The communication section 130 further includes a transmitter 133. The transmitter 133 is configured to transmit a status of data requests to the UI 110. In some embodiments, the status of the data requests is wirelessly transmitted to the UI 110. In some embodiments, the status of the data requests is transmitted to the UI 110 via a wired connection. In some embodiments, the transmitter 133 is configured to provide an update on a data request automatically in response to an update in the memory unit 132. In some embodiments, the transmitter 133 is configured to provide an update on a data request in response to a received update request from the user. In some embodiments, the transmitter 133 is configured to automatically transmit a request ID upon initially saving the data request in the memory unit 132. In some embodiments, the status of the data request includes a priority level of the data request. In some embodiments, the status of the data request includes an estimated time until the data request is transmitted to the vehicle 140.

The communication section 130 further includes a query queue 134 configured to store data requests in priority order for transmission to the vehicle 140. In some embodiments, the query queue 134 is integrated into the memory unit 132. In some embodiments, the query queue 134 is separate from the memory unit 132. In some embodiments, the query queue 134 is configured to retrieve data requests from the memory unit 132 based on priority level and time stamp information. In some embodiments, the query queue 134 is configured to order data requests based on priority level; and by time since initial saving in the memory unit 132 in response to data requests having a same priority level.

The communication section 130 further includes a transmitter 135 configured to transmit data requests to the vehicle 140 from the query queue 134. The transmitter 135 is configured to transmit the data requests to the vehicle 140 based on an order of the data requests in the query queue 134. In some embodiments, the data requests are transmitted to the vehicle 140 wirelessly. In some embodiments, the data request are transmitted to the vehicle 140 by a wired connection. The data requests transmitted to the vehicle 140 include trigger event information, data duration information related to how long before and after the trigger event the data should be collected, and sensor information indicating a type of sensor of the vehicle 140 should collect the data. In some embodiments, the data requests transmitted to the vehicle 140 include priority level information. In some embodiments, the transmitter 135 is configured to transmit data requests to the vehicle 140 when the vehicle 140 sends a request to server 120 to transmit the data requests to the vehicle 140. In some embodiments, the transmitter 135 is configured to transmit data requests to the vehicle 140 any time the communication section 130 has sufficient connectivity to the vehicle 140 to transmit the data request unless the communication section 130 has received information indicating that the vehicle 140 is unable to accept a new data request. In some embodiments, the transmitter 135 is configured to transmit the data requests to the vehicle 140 periodically so long as the vehicle 140 is able to receive new data requests and the transmitter 135 has sufficient connectivity to the vehicle 140. In some embodiments, the transmitter 135 is configured to transmit the data requests to the vehicle 140 in batches, such as in groups of 5 data requests, 20 data requests or some other number of data requests. In some embodiments, the transmitter 135 is configured to request confirmation of receipt of the data request from the vehicle 140. In response to failing to receive confirmation of receipt from the vehicle for a predetermined time period, the transmitter 135 is configured to re-transmit the data request. In some embodiments, the status of the data request stored in the memory unit 132 is updated to indicate submission to the vehicle 140 in response to the communication section 130 receiving confirmation of receipt of the data request from the vehicle 140.

The communication section 130 further includes a receiver 136 configured to receive notification of the occurrence of trigger events from the vehicle 140. In some embodiments, the occurrence of a trigger event is receipt of a data request. In some embodiments, the receiver 136 is configured to receive the notification of the trigger events wirelessly. In some embodiments, the receiver 136 is configured to receive the notification of the trigger events via a wired connection. In some embodiments, the receiver 136 is configured to send a signal to the memory unit 132 to update a status of a data request related to the notified trigger event.

The communication section 130 further includes a receiver 137 configured to receive data from the vehicle 140 responsive to the data requests transmitted by the transmitter 135. In some embodiments, the data is split by the vehicle 140 into data packets that is the unit of transmission from the vehicle 140 to the server 120, and the receiver 137 receives the data packet from the vehicle 140. In some embodiments, the receiver 137 is configured to receive the data wirelessly. In some embodiments, the receiver 137 is configured to receive the data via a wired connection. In some embodiments, the receiver 137 is configured to send a signal to the memory unit 132 to update a status of a data request related to the receipt of requested data. In some embodiments, the data responsive a single data request is received in a single packet from the vehicle 140. In some embodiments, the data responsive to a single data request is received in multiple packets from the vehicle 140. The receiver 137 transfers the received data to a pre-processor 122.

The server 120 further includes the pre-processor 122 configured to receive data from the receiver 137 and perform pre-processing on the data to generate collected data. In some embodiments, the pre-processing includes reforming of data from multiple packets to compile data responsive to a data request. In some embodiments, the pre-processing includes de-serializing of data to compile structured data from a byte array that is received. In some embodiments, the pre-processing includes de-compressing of data if the data is compressed by the vehicle 140 before sending. In some embodiments, the pre-processing includes error correction by Error Correction Code (ECC) such as Reed-Solomon (RS) Code, Bose-Chaudhuri-Hocquenghem (BCH) code, Low-density parity-check (LDPC) code and the like. In some embodiments, the pre-processing includes smoothing of data by removing outlier values to reduce a risk of report incorrect data to the user. In some embodiments, the pre-processing includes associating data request ID information, priority level information or other suitable information with the received data from the receiver 137. In some embodiments, the data is pre-processed so that the information is provided to the user in a format that is easy to understand and does not rely on specialized knowledge or equipment to discern the information.

The server 120 further includes a data storage 126 configured to store the collected data generated by the data pre-processor 122. In some embodiments, the data storage 126 is integrated with the memory unit 132. In some embodiments, the data storage 126 is separate from the memory unit 132. In some embodiments, the data storage 126 includes a solid state drive (SSE), a random access memory or another suitable memory. In some embodiments, the data storage 126 is accessible by the user, e.g., using the UI 110 or an accessible console 150. In some embodiments, the data storage 126 is configured to notify the user in response to data related to a data request is available. In some embodiments, the notification includes an alert to the user. In some embodiments, the alert includes an audio or visual alert. In some embodiments, the data storage 126 is configured to cause the UI 110 or the accessible console 150 to automatically display the notification of an availability of the collected data. In some embodiments, the data storage 126 is accessible by a user using the accessible console 150 without the user submitting a data request. In some embodiments, the data within the data storage 126 are searchable by the user via the accessible console 150. In some embodiments, the collected data is visualized in the console 150.

The ODDR system 100 further includes a vehicle 140. The vehicle 140 includes sensors to detect both an internal status of the vehicle 140 as well as an external environment surrounding the vehicle 140. In some embodiments, the sensors include a camera, a light distance and ranging (LiDAR) sensor, a radio distance and ranging (RADAR) sensor, a sound navigation and ranging (SONAR) sensor, an accelerometer, a steering wheel position, a speedometer, or another suitable sensor. The vehicle 140 is capable of receiving data requests, either wirelessly or via a wired connection.

In some embodiments, in response to receiving the data request, the vehicle 140 is configured to assign a data request ID to the received data request and the data request is processed to be agnostic to an originating system or program of the data request. In another embodiments, the communication section 130 instead of the vehicle 140 assigns the data request ID, and the data request ID is included in the data request that is sent from the communication section 130 to the vehicle 140. Making the data request agnostic to the originating system or program of the data request helps with expanding an ability of the vehicle 140 to receive and process a wide range of data requests from different users and systems. The vehicle 140 includes a processor for processing the data requests and determining what type of information from which sensors available in the vehicle 140 are capable of satisfying the data request. The vehicle 140 further includes a memory for storing data from the sensors. In some embodiments, the processor access the memory to determine whether any stored data is capable of satisfying the data request. The vehicle 140 is further capable of transmitting the data deemed to satisfy the data request to the server 120 either wirelessly or via a wired connection. In some embodiments, the processor is configured to attempt to satisfy received data requests in a priority order based on a received priority level of the data request. In some embodiments, the vehicle 140 is configured to transmit data to the server preferentially based on the received priority level of the data request.

In some embodiments, the memory and the processor of the vehicle 140 are configured to store and execute software applications in an electronic control unit (ECU) within the vehicle 140. In some embodiments, a data request is generated by the software application stored in the ECU. In some embodiments, the data request is generated in response to a trigger event, such as sudden acceleration, sudden braking, capturing an sensor data including specific objects or specific scenes that are predefined in the software application, "crashing" of the software application, a detected abnormality in the software application, or another suitable detected occurrence. In some embodiments, the vehicle 140 is configured to generate a notification to a maintainer, e.g., the user, of the software application in response to detecting a trigger event associated with the software application. In some embodiments, the notification is transmitted, either wirelessly or through a wired connection, directly to the user, e.g., through the UI 110. In some embodiments, the notification is transmitted, either wirelessly or through a wired connection, to the user through the server 120. In some embodiments, the notification includes an audio or visual notification. In some embodiments, the notification is configured to cause the UI 110 to automatically display the notification without user interaction.

The ODDR system 100 further includes an accessible console 150. The accessible console 150 permits the user to access the collected data stored in the data storage 126. In some embodiments, the accessible console 150 is integrated with the UI 110. In some embodiments, the accessible console 150 is separate from the UI 110. In some embodiments, the accessible console 150 includes another server separate from the server 120. In some embodiments, the accessible console 150 automatically receives collected data related to a data request from the user upon receipt of the collected data by the data storage 126. In some embodiments, the accessible console 150 permits the user to search the data storage 126 to determine whether any of the collected data stored in the data storage 126 are useful to the user without the user submitting a data request.

Using the ODDR system 100 permits users to obtain information from one or more vehicles 140 in a format that is easy to understand without relying on specialized equipment to request or read the received data. The ability to prioritize data requests in the ODDR system 100 help to ensure that law enforcement is able to obtain data relevant to public safety, while also permitting user to pay a fee to obtain data faster. This flexibility helps to improve the usefulness of the ODDR system 100 for a wide range of users.

Figure 2:
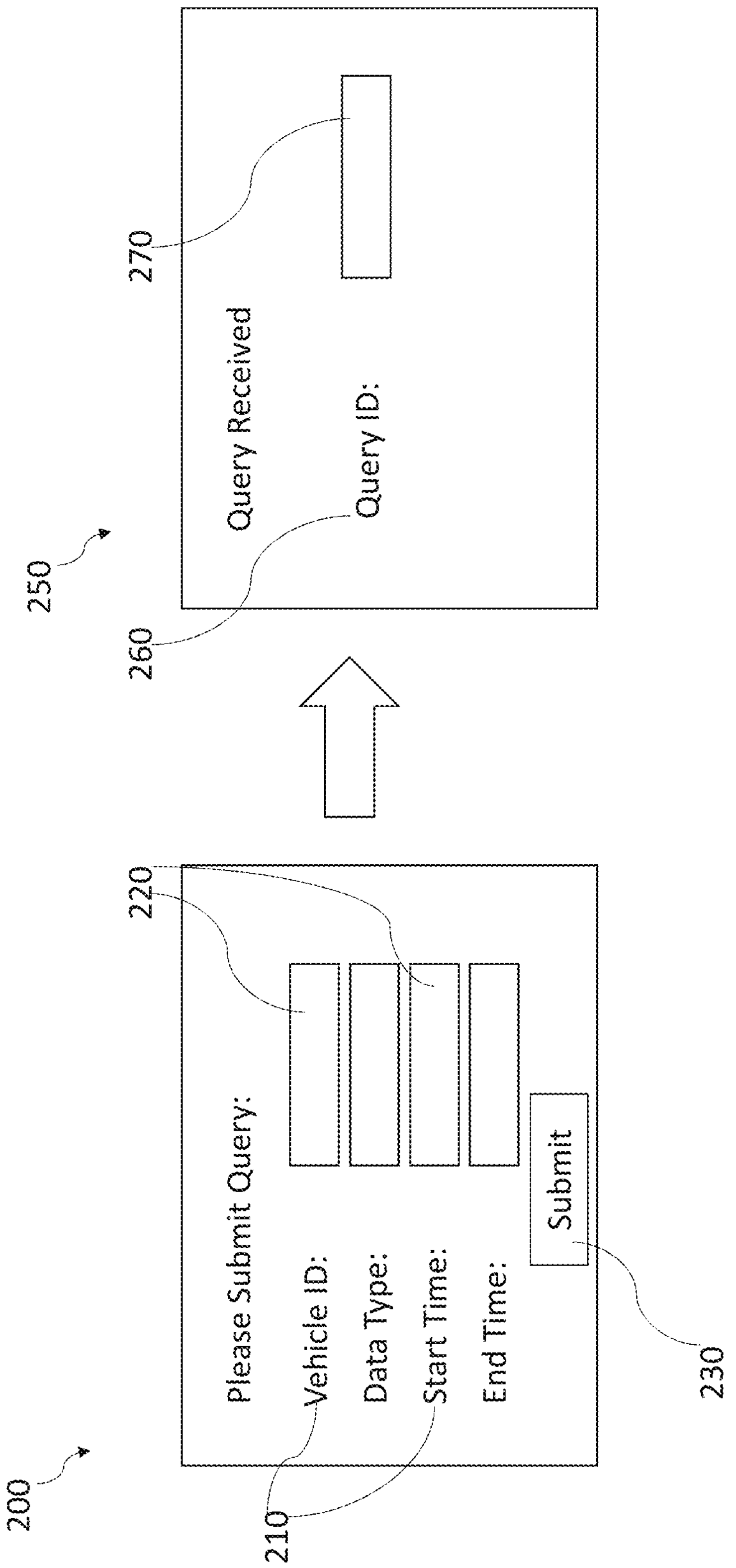
FIG. 2 is views of a graphical user interface (GUI) for an ODDR system in accordance with some embodiments.

FIG. 2 is views of a graphical user interface (GUI) 200 and 250 for an ODDR system in accordance with some embodiments. In some embodiments, the GUI 200 is usable as UI 110 in ODDR system 100 (FIG. 1). In some embodiments, the GUI 200 is usable to generate a data request for receipt by the receiver 131 (FIG. 1). The GUI 200 includes a plurality of information types 210 which identify a type of information that the GUI 200 is able to accept from the user. The GUI 200 further includes a plurality of fields 220 configured to receive information related to a corresponding information type 210 of the GUI 200. The GUI 200 further includes a submit button 230 configured to submit a data request to a server, e.g., server 120 (FIG. 1), based on the information in the fields 220. One of ordinary skill in the art would recognize that the names and number of the plurality of information types 210 is merely exemplary and that different numbers and types of information are also within the scope of this disclosure.

In some embodiments, the fields 220 includes fields for users to enter the vehicle ID, the data type, the start time and the end time In some embodiments, the field 220 further includes a field for users to enter a priority level of the data request. In some embodiments, the GUI 200 further includes information related to how a user is able to increase a priority level of a data request, such as indicating a fee associated with each available priority level. In some embodiments, the GUI 200 includes fields 220 for allowing a user to enter log in information to establish an identity of the user. In some embodiments, the GUI 200 is configured to display a priority level of the user following receiving log in information. In some embodiments, the GUI 200 further includes fields 220 for receiving payment information related to fees for establishing a priority level of a data request.

The GUI 250 is configured to be displayed to the user after the user has selected the submit button 230 on GUI 200. In some embodiments, the GUI 250 is usable as the GUI 110 in the ODDR system 100 (FIG. 1). The GUI 250 includes information indicating that the data request has been received. The GUI 250 includes a query ID label 260 and a query ID field 270. Information for populating the query ID field 270 is received from a server, e.g., server 120 (FIG. 1), following the server receiving and storing the data request. In some embodiments, the GUI 250 includes information of the vehicle ID. In some embodiments, the GUI 250 includes information related to a priority level of the data request. In some embodiments, the GUI 250 includes information regarding a status of the data request, such as pending, submitted, completed, etc. In some embodiments, the GUI 250 includes information related to an estimated time until the data request is submitted to a vehicle, e.g., vehicle 140 (FIG. 1). In some embodiments, the GUI 250 is displayed automatically in response to receipt of query ID information from the server. In some embodiments, the GUI 250 is displayed in response to a user submitting a request for an update on an uploaded data request.

Figure 3:
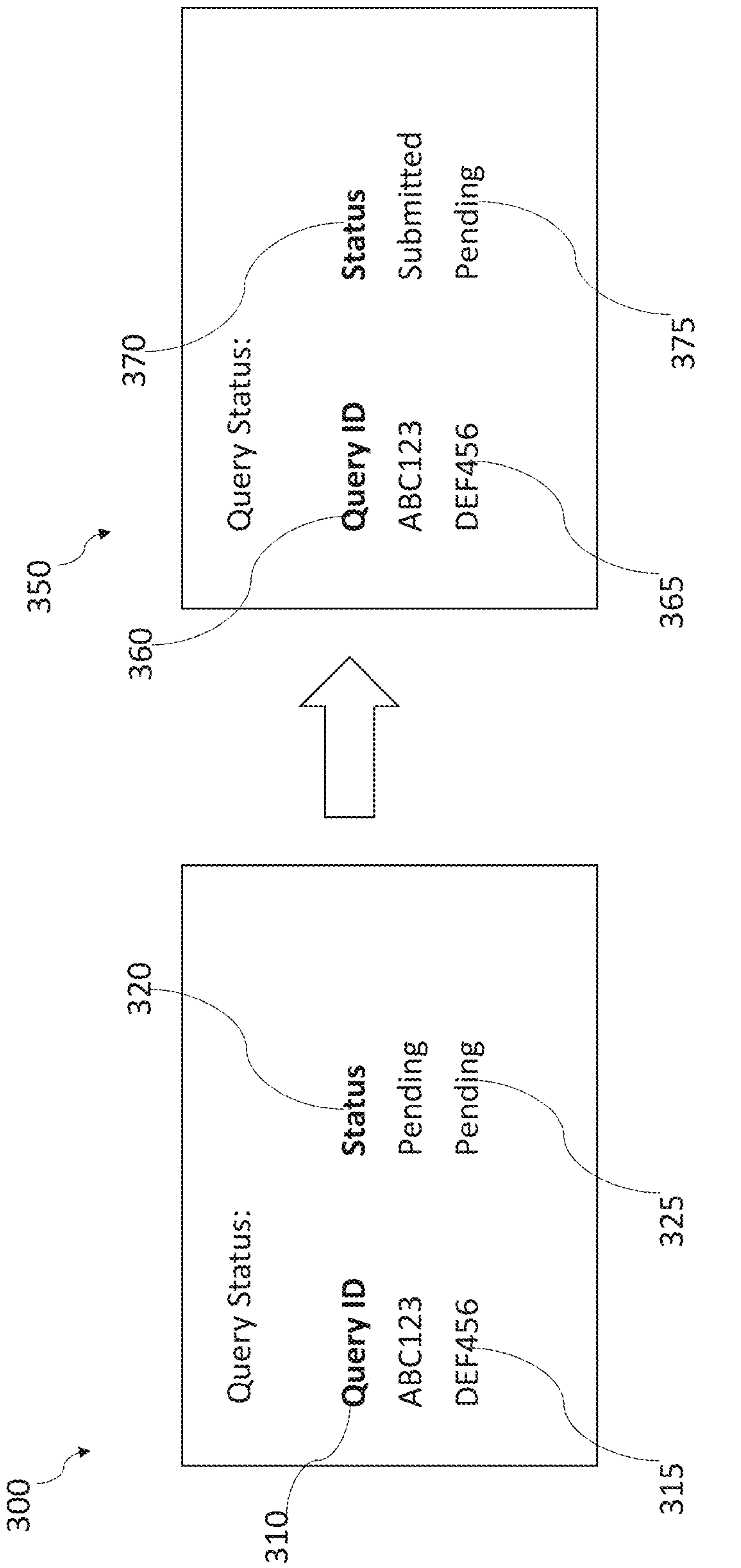
FIG. 3 is views of a GUI for an ODDR system in accordance with some embodiments.

FIG. 3 is views of a GUI 300 and 350 for an ODDR system in accordance with some embodiments. In some embodiments, the GUI 300 is usable as UI 110 in ODDR system 100 (FIG. 1). In some embodiments, the GUI 300 is usable to generate a data request, for example, a data request receivable by the receiver 131 (FIG. 1). The GUI 300 includes information related to a status of data requests. The GUI 300 includes a query ID label 310 along with fields 315 including various query ID's. The GUI 300 further includes a status label 320 and fields 325 including status information corresponding to the associated query ID. In GUI 300 both the query ID's ABC123 and DEF456 have a status of "pending." In some embodiments, the pending status indicates that the data request has been received by the server, e.g., server 120 (FIG. 1), but has not yet been transmitted to the vehicle, e.g., vehicle 140 (FIG. 1). In some embodiments, the GUI 300 includes a vehicle ID label and fields including a vehicle ID corresponding to the query. In some embodiments, the GUI 300 is configured to display all data requests associated with the user. In some embodiments, the GUI 300 is configured to display less than all data requests associated with the user. One of ordinary skill in the art would recognize that the number of query ID's in FIG. 3 is merely exemplary and that displaying more or less query ID's are within the scope of this disclosure.

The GUI 350 includes information relate to a status of data requests. In some embodiments, the GUI 350 is usable as the UI 110 in the ODDR system 100 (FIG. 1). Similar to GUI 300, the GUI 350 includes a query ID label 360 and fields 365 with various query ID's. The GUI 350 further includes a status label 370 and field 375 including status information corresponding to the associated query ID. In contrast with GUI 300, GUI 350 includes a status of query ID ABC123 is "submitted." In some embodiments, the status submitted indicates that the data request has been transmitted to the vehicle, e.g., vehicle 140 (FIG. 1), but no data related to the data request has been received from the vehicle. In some embodiments, the GUI 300 is configured to change to the GUI 350 automatically in response to receipt of updated status information. In some embodiments, the GUI 300 is configured to change to the GUI 350 in response to a received request from the user for a status updated. In some embodiments, the GUI 350 is configured to automatically provide an alert to the user when a status a data request is updated. In some embodiments, the alert includes an audio or visual alert. In some embodiments, the alert causes the GUI 350 to automatically display on a mobile device controllable by the user. In some embodiments, only data requests having an updated status are displayed on the GUI 350. In some embodiments, the GUI 350 is configured to display data requests having an updated status in a different manner, e.g., highlighted, than data requests that do not have an updated status.

Figure 4:
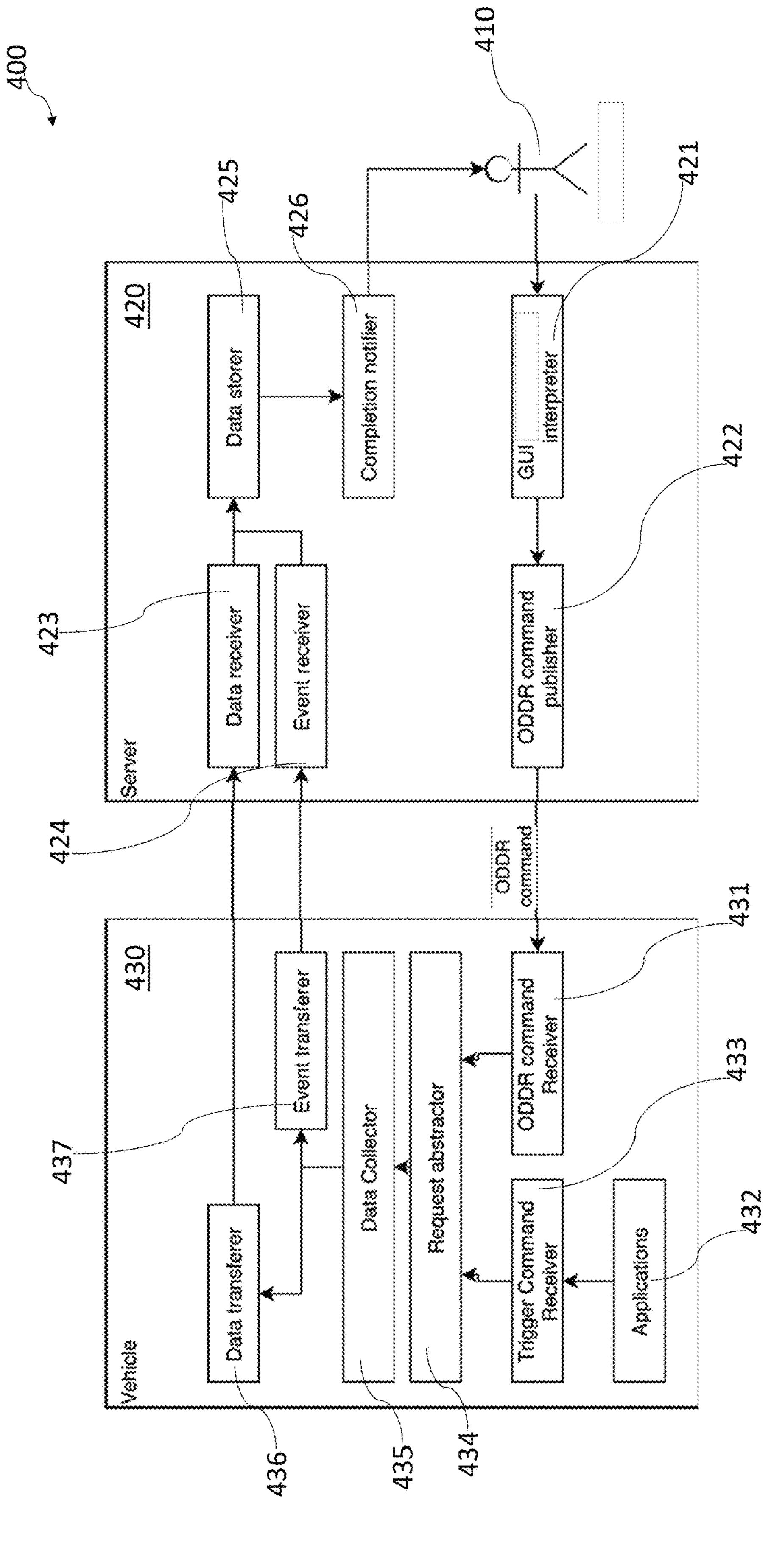
FIG. 4 is a schematic diagram of an ODDR system in accordance with some embodiments.

FIG. 4 is a schematic diagram of an ODDR system 400 in accordance with some embodiments. In some embodiments, the ODDR system 400 is usable as the ODDR system 100 (FIG. 1). The ODDR system 400 includes a server 420 configured to receive information related to a data request from a user 410. In some embodiments, the user 410 is able to use a UI, e.g., UI 110 (FIG. 1), such as a GUI, e.g., GUI 200 (FIG. 2), to enter information for a data request to be transmitted to a vehicle 430. In some embodiments, the UI includes a command line interface (CLI) or a structured query language (SQL) interface.

The server 420 is configured to receive the data request from the user 410 using a GUI interpreter 421. One of ordinary skill in the art would recognize the GUI is merely an example and that a CLI or SQL interpreter is also usable in ODDR system 400. In some embodiment, the GUI interpreter 421 includes similar functionality as the receiver 131 (FIG. 1). The GUI interpreter 421 is configured to receive the data request and instruct a memory, e.g., memory unit 132 (FIG. 1), in the server 420 to store the data request.

The server 420 is further configured to transmit the data request using ODDR command publisher 422. In some embodiments, the ODDR command publisher 422 includes similar functionality as query queue 134 and transmitter 135 (FIG. 1). The ODDR command publisher 422 is configured to transmit the data request to the vehicle 430. In some embodiments, the data request is transmitted wirelessly. In some embodiments, the data request is transmitted via a wired connection. In some embodiments, the ODDR command publisher 422 is configured to prioritize transmission of data requests based on a priority level of the data request. In some embodiments, the priority level of the data request is determined based on an identity of the user 410, a fee paid by the user 410, a time at which the server 420 received that data request from the user 410 or other suitable parameters. In some embodiments, the data request transferred to the vehicle 430 from the server 420 is called an ODDR command.

The server 420 is further configured to receive data from the vehicle 430 using data receiver 423. In some embodiments, the data receiver 423 includes similar functionality as receiver 137 (FIG. 1). The data receiver 423 is configured to receive data such as sensor data and application logs from the vehicle 430 in response to the data request. In some embodiments, the sensor data includes camera images, point cloud data, RADAR data, SONAR data or other suitable data. In some embodiments, the data receiver 423 is configured to perform pre-processing on the received data. The data receiver 423 is configured to transfer the received data to a data storer 425 for storage in the server 420.

The server 420 is further configured to receive event data from the vehicle 430 using event receiver 424. In some embodiments, the event receiver 424 includes similar functionality as receiver 136 (FIG. 1). The event receiver 424 is configured to receive information related to an occurrence of a trigger event associated with a data request. The event receiver 424 is configured to transfer the event data to the data storer 425 for storage in the server 420.

The server 420 is further configured to store event data and received data using a data storer 425. In some embodiments, the data storer 425 includes similar functionality as at least one of the memory unit 132 or the data store 126 (FIG. 1). The data storer 425 is configured to store the received data in conjunction with the event data related to the received data. The data storer 425 is configured to store the received data in conjunction with a query ID associated with the data request satisfied by the received data. In some embodiments, the data storer 425 includes a solid state memory, a random access memory or another suitable type of memory.

The server 420 is further configured to notify the user 410 in response to receiving data satisfying a data request using a completion notifier 426. In some embodiments, the completion notifier 426 includes similar functionality as the data storage 126 (FIG. 1). The completion notifier 426 is configured to alert the user 410 that a data request has been satisfied. In some embodiments, the alert includes an audio or visual alert. In some embodiments, the alert causes a mobile device controllable by the user 410 to display the alert. In some embodiments, the mobile device is integrated into or connectable to at least one of the accessible console 150 or the UI 110 (FIG. 1). In some embodiments, the completion notifier 426 is configured to alert the user 410 only when an entirety of a data request has been satisfied. In some embodiments, the completion notifier 426 is configured to alert the user 410 when a portion of the data request has been satisfied. In some embodiments, the completion notifier 426 is configured to transmit data from the data storer 425 along with the alert. In some embodiments, the completion notifier 426 is configured to prompt the user to access the data, e.g., using accessible console 150 (FIG. 1). In some embodiments, the completion notifier 426 is configured to transmit a query ID associated with the data request along with the alert.

The ODDR system 400 further includes vehicle 430 which is configured to receive the data request from the server 420; collect data from sensor attached to the vehicle 430 and transmit the data to server 420. The vehicle 430 is configured to receive the data request using an ODDR command receiver 431. The ODDR command receiver 431 is configured to receive the data request from the server 420 and transfer the data request to a request abstractor 434. In some embodiments, the ODDR command receiver 431 is configured to perform pre-processing on the data request, such as determining a priority level of the data request or identifying sensors in the vehicle 430 capable of capturing data related to the data request. In some embodiments, the ODDR command receiver 431 is configured to process the data request in order to facilitate communication between the server 420 and components of the vehicle 430, such as the data collector 435.

The vehicle 430 further includes applications 432 which are running on a processor in the vehicle 430. In some embodiments, the applications 432 includes automated-driving system applications such as an object recognition application, a road recognition application, a sensor fusion application, a localization application, path planner application, controller application, etc. In some embodiments, the applications 432 are configured to monitor sensor data, internal status of the applications 432, performance of the vehicle 430 and an environment surrounding the vehicle 430. The applications 432 are configured to determine whether conditions of events (trigger events) such as sudden changes in acceleration, capturing of images of objects surrounding the vehicle 430 or other suitable events are met.

In response to a determination by the applications 432 that the trigger event occurred, the application 432 sends a data request to request abstractor 434 via trigger command receiver 433. In some embodiments, the applications 432 are configured to generate application logs which store internal status and internal events of the applications 432, the application logs are sent to the data collector 435 periodically, and the application logs are transmitted by the data transferer 436 when server 420 sends a data request to the vehicle 430 to collect the application logs.

The vehicle 430 further includes a trigger command receiver 433 configured to receive a data request from the applications 432. The trigger command receiver 433 is configured to transfer the data request from the application to the request abstractor. The trigger command receiver 433 is configured to process a specific communication protocol, such as inter-process communication (IPC) within the vehicle 430.

The vehicle 430 further includes the request abstractor 434. The data collector 435 is configured to receive a data request from either application 432 or the server 420. When the data request is received from the server 420, the data request is processed by ODDR command receiver 431 which is configured to process a specific communication protocol between server 420 and vehicle 430. When the data request is received from applications 432, the data request is processed by trigger command receiver 433. The request abstractor 434 is configured to abstract the data request so that the abstracted data request is independent from the communication protocol and the data requester 435 regardless of whether the data request is received from the server 420 or the applications 432. In this way the data collector 435 is made agnostic to the origin of the data request and is able to process the data request regardless the origin. In some embodiments, the request abstractor 434 is configured to analyze the data request and determine which types of trigger events the data request is targeting. In some embodiments, the request abstractor 434 adds a requestor type to the ODDR command. For example, in some embodiments, the request abstractor 434 includes information in the abstracted requestor indicating whether the ODDR command originated from outside of the vehicle or from an application within the vehicle. In some embodiments, the requestor type information includes a boolean operator indicating whether the ODDR command was received from outside of the vehicle. In some embodiments, the requestor type information includes a requestor ID. In some embodiments, receipt of the data request constitutes a trigger event. In response to receipt of the data request from ODDR command receiver 431 or trigger command receiver 433, the request abstractor 434 is also configured to transmit the abstracted data request to a data collector 435.

The vehicle 430 further includes the data collector 435 configured to retrieve data from the memory in the vehicle 430 or from an application log in one or more applications 432 in response to instructions from the request abstractor 434. The data collector 435 determines what data to collect based on the abstracted request from the request abstractor 434. In some embodiments, the instructions received by the data collector 435 include information related a time duration before and after the trigger event to collect data. In some embodiments, the instructions received by the data collector 435 include information related to a type of data, such as type of sensor, to collect in response to occurrence of the trigger event. In some embodiments, the data collector 435 is configured to transmit a notification to an event transferer 437 of the occurrence of a trigger event associated with a data request. In some embodiments, the determination of whether the trigger event has occurred is determined by receipt of a data request from the server 420 or from the applications 432. In some embodiments, the determination of whether the trigger event has occurred is determined based on data received from the sensors of the vehicle satisfying a trigger condition determined in a received data request. The data collector 435 is configured to transmit the collected data for satisfying the data request to a data transferer 436.

The data transferer 436 is configured to transmit the data from the data collector 435 to the server 420. In some embodiments, the data transferer 436 is configured to transmit the data wirelessly. In some embodiments, the data transferer 436 is configured to transmit the data via a wired connection. In some embodiments, the data transferer 436 is configured to transmit the data along with a query ID of the data request. In some embodiments, the data transferer 436 is configured to transmit information indicating whether the data being transmitted partially or completely satisfies the data request. In some embodiments, the data transferer 436 is configured to transmit priority level information associated with the data request at least partially satisfied by the data.

The event transferer 437 is configured to transmit the trigger event data from the data collector 435 to the server 420. In some embodiments, the event transferer 437 is configured to transmit the trigger event data wirelessly. In some embodiments, the event transferer 437 is configured to transmit the trigger event data via a wired connection. In some embodiments, the event transferer 437 is configured to transmit the trigger event data along with a query ID of the data request. In some embodiments, the event transferer 437 is configured to transmit priority level information associated with the data request related to the trigger event data. In some embodiments, the event transferer 537 is configured to transmit metadata associated with the trigger event in response to detection of the trigger even occurring. The metadata, such as trigger event time and data collection time range, helps the sever 420 to know that the sensor data from the data transferer 436 will be transmitted in order to help the server 420 optimize data processing. In some embodiments, the event transferer 437 is omitted and the metadata is transmitted by the data transferer 436.

Using the ODDR system 400 permits users to obtain information from one or more vehicles 430 in a format that is easy to understand without relying on specialized equipment to request or read the received data. The ability to prioritize data requests in the ODDR system 400 help to ensure that law enforcement is able to obtain data relevant to public safety, while also permitting user to pay a fee to obtain data faster. This flexibility helps to improve the usefulness of the ODDR system 400 for a wide range of users.

Figure 5:
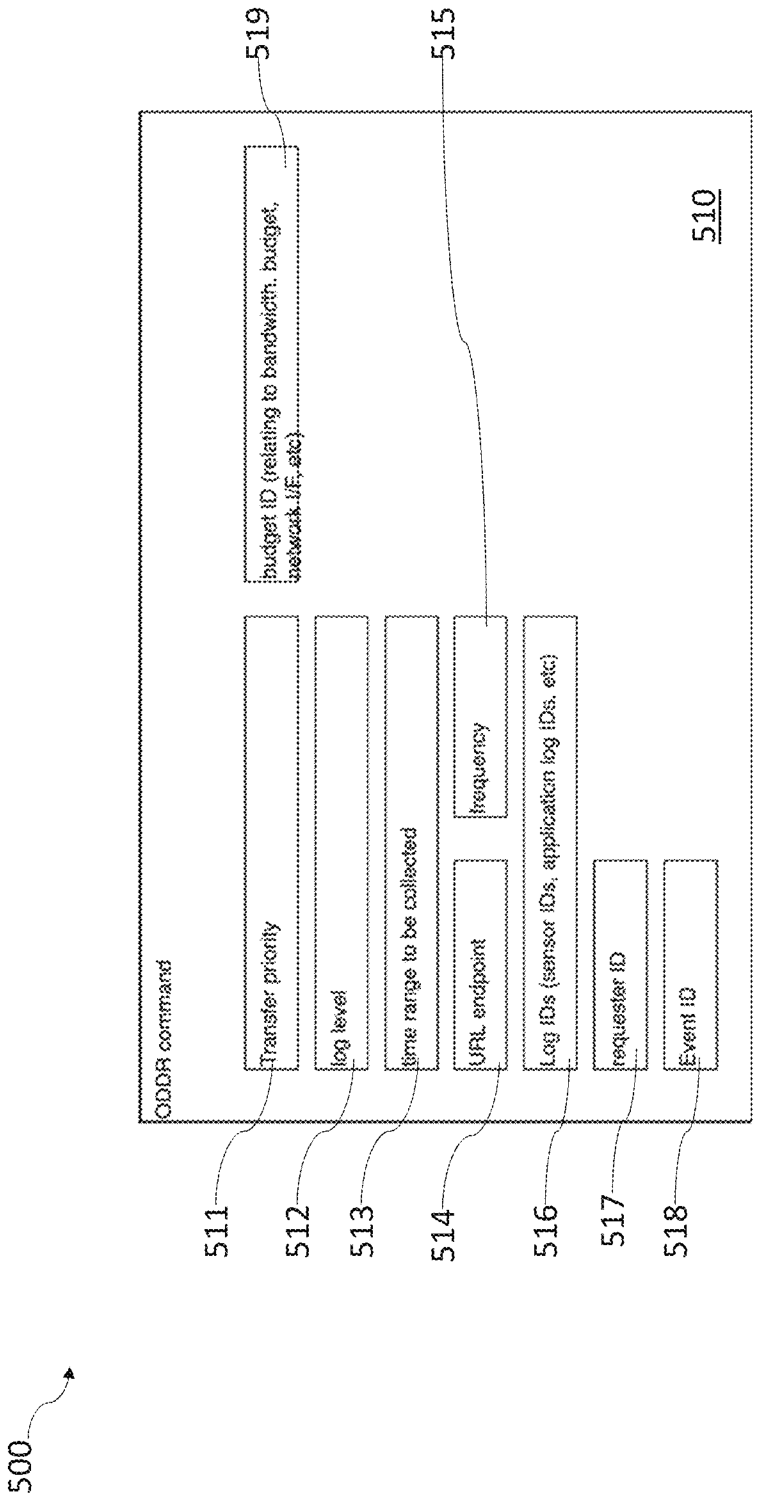
FIG. 5 is a diagram of a data structure of an ODDR command in accordance with some embodiments.

FIG. 5 is a diagram of a data structure 500 of an ODDR command 510 in accordance with some embodiments. In some embodiments, the ODDR command 510 is transmitted from the server 420 to the vehicle 430 (FIG. 4). The ODDR command 510 includes information related to a type of data sought by a data request to a vehicle, e.g., vehicle 430 (FIG. 4) or vehicle 140 (FIG. 1).

The ODDR command 510 includes a transfer priority parameter 511 that indicates a priority level of the data request. The ODDR command 510 further includes a log level parameter 512 that indicates what type of data, if any, should be retrieved from other applications on the vehicle. For example, in some embodiments, the ODDR command 510 retrieves data from an object recognition application. The log level parameter 512 determines what type of data to retrieve from the other application, such as error level or critical level. In some embodiments, the log level parameter 512 is omitted from the ODDR command 510 or the log level parameter 512 is left in a null state. The ODDR command 510 further includes a time range to be collected parameter 513 that indicates a time period before and/or after a trigger event to collect data. The time range is corresponding to the start time and the end time that was entered in GUI 200 by the users. The ODDR command 510 further includes a uniform resource locator (URL) endpoint parameter 514 that indicates a destination for the data collected in response to the data request. The ODDR command 510 further includes a frequency parameter 515 that indicates how often, if ever, the data should be sampled from the rime range 513. For example, when the event time is t=100 sec, the time range comprises start time=−1 sec and end time=2 sec and the frequency is 10 Hz (100 msec cycle), then the data at t=99.0 sec, 99.1 sec, 99.2 sec, . . . , 101.9 sec, 102.0 sec is collected by the ODDR command. The ODDR command 510 further includes a log ID parameter 516 that indicates types of sensors and/or applications usable to collect the data requested by the data request. In some embodiments, unique IDs (such as Universally unique identifier (UUID)) are pre-assigned to all the sensors and applications, and the unique IDs which the user want to collect data from is specified in the log ID parameter 516. The ODDR command 510 further includes a requester ID parameter 517 that indicates an identity of the user that made the data request. The ODDR command 510 further includes an event ID parameter 518 that indicates a trigger event associated with the data request. The ODDR command 510 further includes a budget ID parameter 519 that indicates how much of the resources of the vehicle, e.g., vehicle 140 (FIG. 1) or vehicle 430 (FIG. 4), should be allocated to satisfying the data request. One of ordinary skill in the art would understand that additional parameters are possible in the ODDR command 510. For example, in some embodiments, the ODDR command 510 includes vehicle location parameter that indicates a geographic area where the trigger event is capable of occurring. One of ordinary skill in the art would also understand that the ODDR command 510 does not always include all of the parameters in FIG. 5. For example, in some embodiments, the budget ID parameter 519 is omitted.

Figure 6:
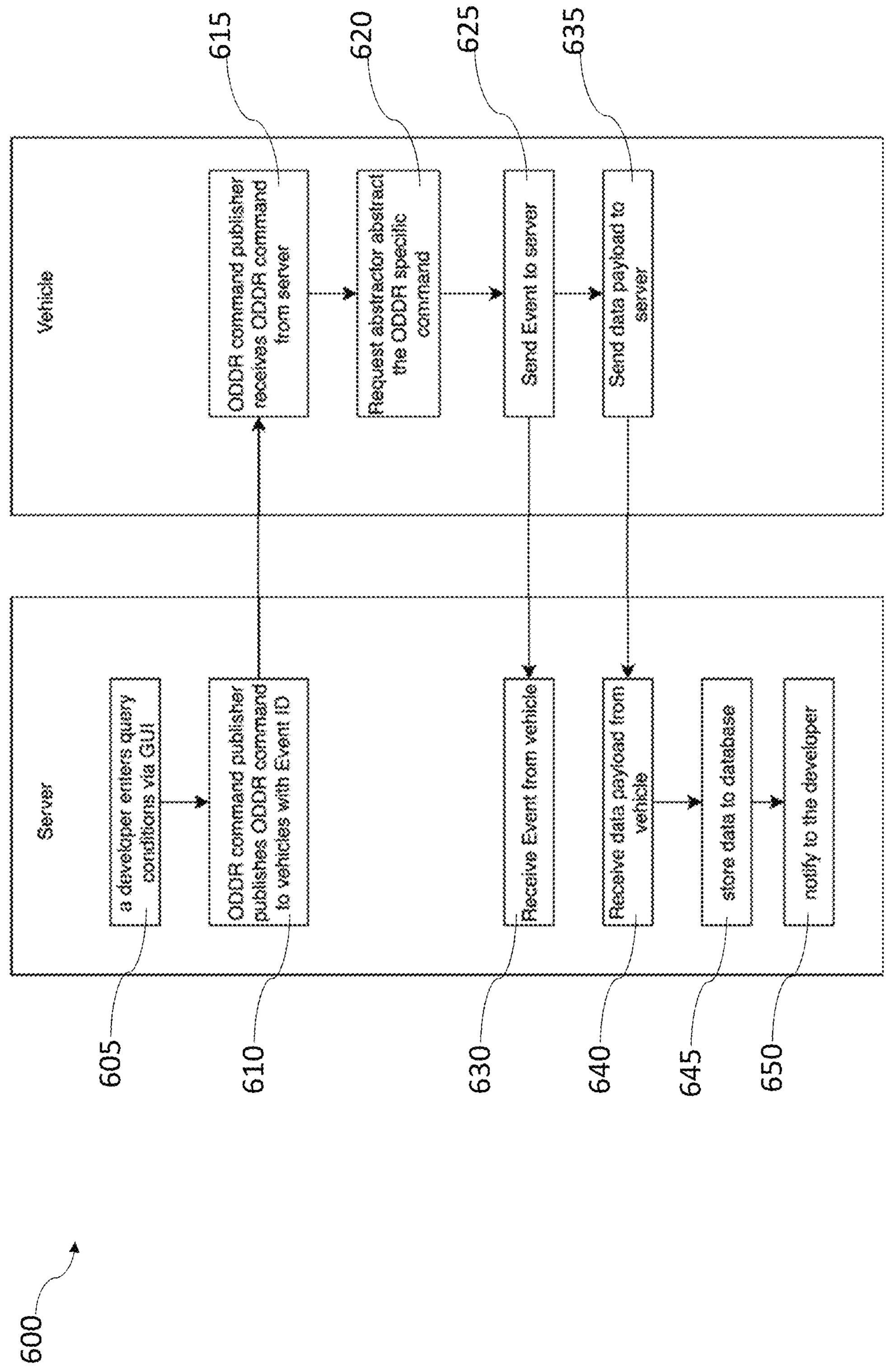
FIG. 6 is a flowchart of a method of using an ODDR system in accordance with some embodiments.

FIG. 6 is a flowchart of a method 600 of using an ODDR system in accordance with some embodiments. The method 600 is based on a received data request from a user. One of ordinary skill in the art would understand, based on the above description, how to modify the method 600 to correspond to a data request generated by an application running in the vehicle. In some embodiments, the method 600 is implemented using ODDR system 100 (FIG. 1), ODDR system 400 (FIG. 4) or another suitable ODDR system. The method 600 includes operation 605 in which a server receives a data request from a user, such as a developer, that entered query conditions for the data request into a GUI. In some embodiments, the GUI includes a mobile device controllable by the user. The server, e.g., server 120 (FIG. 1) or server 420 (FIG. 4), is configured to receive the data request wirelessly or via a wired connection.

The method 600 further includes operation 610 in which an ODDR command is transmitted to one or more vehicles, e.g., vehicle 140 (FIG. 1) or vehicle 430 (FIG. 4). The ODDR command corresponds to the data request received by the server and includes event ID information for identifying a trigger event for causing the vehicle to collect data for satisfying the data request. In some embodiment, the data request constitutes the trigger event.

The method 600 further includes operation 615 in which the vehicle, e.g., vehicle 140 (FIG. 1) or vehicle 430 (FIG. 4), receives the ODDR command. In some embodiments, the ODDR command has a data structure 500 similar to the ODDR command 510 (FIG. 5). The ODDR command is received either wirelessly or via a wired connection. In some embodiments, the ODDR command is pre-processed, such as determining a priority level of the data request or identifying sensors in the vehicle capable of capturing data related to the data request. In some embodiments, the ODDR command is processed to facilitate communication between the server and components of the vehicle, such as a data collector (435) or a request abstractor (434; FIG. 4).

The method 600 further includes operation 620 in which a request abstractor, e.g. request abstractor 434 (FIG. 4), abstracts the ODDR command in order to make the ODDR command is independent of a communication protocol between the server and the vehicle. The abstracted ODDR command is usable to instruct components in the vehicle to collect data and event information to determine whether a trigger event has occurred and to provide instructions for collecting data to satisfy the data request in response to the trigger event occurring. In some embodiments, event data is collected based applications running on a processor in the vehicle to determine whether the trigger event has occurred. In some embodiments, data stored in a memory in the vehicle is compiled in response to a determination that the trigger even has occurred.

The method 600 further includes operation 625 in which event information is sent to the server. In some embodiments, the event information is sent to the server by event transferer 437 (FIG. 4). The event information is sent to the server either wirelessly or via a wired connection. The event information indicates an occurrence of a trigger event. In some embodiments, the event information includes a query ID associated with the trigger event.

The method 600 further includes operation 630 in which the server receives the event information from the vehicle. In some embodiments, the event information is received by the event receiver 424 (FIG. 4). In some embodiments, the event information is received by receiver 136 (FIG. 1). In some embodiments, the server is configured to notify the user in response to receiving the event information. In some embodiments, the notification includes an audio or visual alert. In some embodiments, the notification is configured to automatically display on a mobile device controllable by the user.

The method 600 further includes operation 635 in which data that at least partially satisfies the data request is transmitted from the vehicle to the server. In some embodiments, the data is transmitted to the server by the data transferer 436 (FIG. 4). The data is transmitted either wirelessly or via a wired connection. In some embodiments, the data includes a query ID associated with the data request at least partially satisfied by the data. In some embodiments where the data includes less than all data for satisfying the data request, the data includes information indicating what portions of the data request are not satisfied by the data. In some embodiments where the data completely satisfies the data request, the data includes information indicating that the entirety of the data request is satisfied by the data. In some embodiments, the data includes data collected from sensors attached to the vehicle, application log data, or other suitable information.

The method 600 further includes operation 640 in which the server receives the data from the vehicle. In some embodiments, the data is received by the data receiver 423 (FIG. 4). In some embodiments, the data is received by receiver 137 (FIG. 1).

The method 600 further includes operation 645 in which the data is stored in a database. In some embodiments, the data is stored in data storage 126 (FIG. 1). In some embodiments, the data is stored in data storer 425 (FIG. 4). In some embodiments, the data is stored in association with the event information.

The method 600 further includes operation 650 in which the user is notified of the available data. In some embodiments, the user is notified using completion notifier 426 (FIG. 4). In some embodiments, the notification includes the data. In some embodiments, the notification includes an indication that the data is available. In some embodiments, the notification causes an alert to display automatically on a mobile device controllable by the user. In some embodiments, the notification includes a visual or audio alert.

In some embodiments, the method 600 includes additional operations. For example, in some embodiments, the method 600 includes prioritizing transmission of ODDR commands to the vehicle based on a priority level of a data request. In some embodiments, at least one operation is omitted from the method 600. For example, in some embodiments, the event information is not transmitted to the server. In some embodiments, an order of operations of the method 600 is changed. For example, in some embodiments, the event information is transmitted to the server (operation 625) prior to the compiling of data associated with the trigger event (operation 620).

The method 600 permits users to obtain information from one or more vehicles in a format that is easy to understand without relying on specialized equipment to request or read the received data. This flexibility helps to improve an ability of a user to develop software using real world data to improve the usefulness of the software product, in some embodiments.

Figure 7:
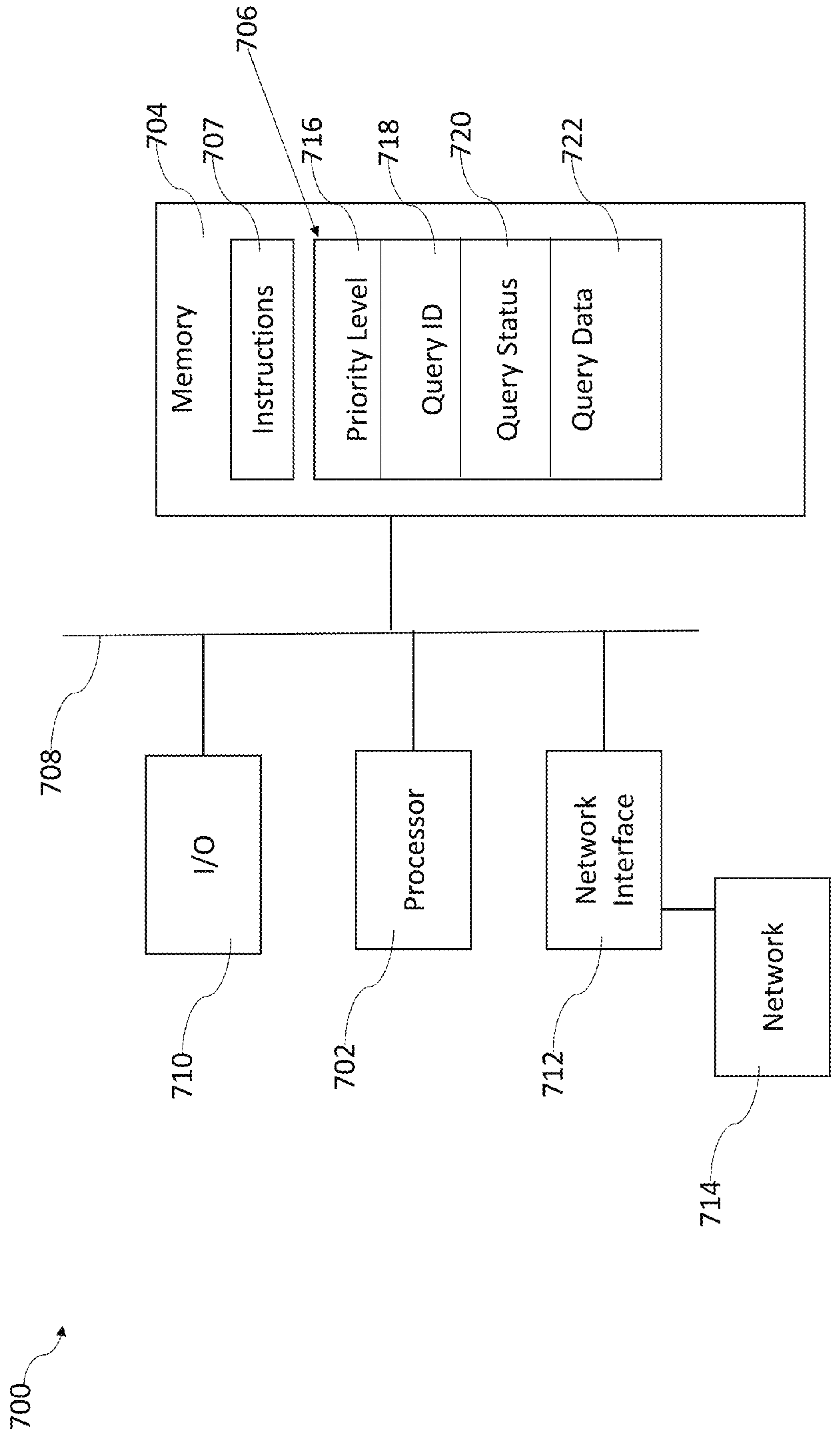
FIG. 7 is a diagram of a system for implementing an ODDR system in accordance with some embodiments.

FIG. 7 is a diagram of a system 700 for implementing an ODDR system in accordance with some embodiments. System 700 includes a hardware processor 702 and a non-transitory, computer readable storage medium 704 encoded with, i.e., storing, the computer program code 706, i.e., a set of executable instructions. Computer readable storage medium 704 is also encoded with instructions 707 for interfacing with external devices. The processor 702 is electrically coupled to the computer readable storage medium 704 via a bus 708. The processor 702 is also electrically coupled to an I/O interface 710 by bus 708. A network interface 712 is also electrically connected to the processor 702 via bus 708. Network interface 712 is connected to a network 714, so that processor 702 and computer readable storage medium 704 are capable of connecting to external elements via network 714. The processor 702 is configured to execute the computer program code 706 encoded in the computer readable storage medium 704 in order to cause system 700 to be usable for performing a portion or all of the operations as described in ODDR system 100 (FIG. 1), ODDR system 400 (FIG. 4) or method 600 (FIG. 6).

In some embodiments, the processor 702 is a central processing unit (CPU), a multi-processor, a distributed processing system, an application specific integrated circuit (ASIC), and/or a suitable processing unit.

In some embodiments, the computer readable storage medium 704 is an electronic, magnetic, optical, electromagnetic, infrared, and/or a semiconductor system (or apparatus or device). For example, the computer readable storage medium 704 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 704 includes a compact disk-read only memory (CD-ROM), a compact disk-read/write (CD-R/W), and/or a digital video disc (DVD).

In some embodiments, the storage medium 7704 stores the computer program code 706 configured to cause system 700 to perform a portion or all of the operations as described in ODDR system 100 (FIG. 1), ODDR system 400 (FIG. 4) or method 600 (FIG. 6). In some embodiments, the storage medium 704 also stores information needed for performing a portion or all of the operations as described in ODDR system 100 (FIG. 1), ODDR system 400 (FIG. 4) or method 600 (FIG. 6) as well as information generated during performing a portion or all of the operations as described in ODDR system 100 (FIG. 1), ODDR system 400 (FIG. 4) or method 600 (FIG. 6), such as a priority level parameter 716, a query ID parameter 718, a query status parameter 720, a query data parameter 722 and/or a set of executable instructions to perform a portion or all of the operations as described in ODDR system 100 (FIG. 1), ODDR system 400 (FIG. 4) or method 600 (FIG. 6).

In some embodiments, the storage medium 704 stores instructions 707 for interfacing with manufacturing machines. The instructions 707 enable processor 702 to generate manufacturing instructions readable by the manufacturing machines to effectively implement method 400 during a manufacturing process.

System 700 includes I/O interface 710. I/O interface 710 is coupled to external circuitry. In some embodiments, I/O interface 710 includes a keyboard, keypad, mouse, trackball, trackpad, and/or cursor direction keys for communicating information and commands to processor 702.

System 700 also includes network interface 712 coupled to the processor 702. Network interface 712 allows system 700 to communicate with network 714, to which one or more other computer systems are connected. Network interface 712 includes wireless network interfaces such as BLUETOOTH, WIFI, WIMAX, GPRS, or WCDMA; or wired network interface such as ETHERNET, USB, or IEEE-1394. In some embodiments, a portion or all of the operations as described in ODDR system 100 (FIG. 1), ODDR system 400 (FIG. 4) or method 600 (FIG. 6) is implemented in two or more systems 700, and information such as priority level, query ID, query status and query data are exchanged between different systems 700 via network 714. An aspect of this description relates to a system. The system includes a non-transitory computer readable medium configured to store instructions thereon. The system further includes a processor connected to the non-transitory computer readable medium. The processor is configured to execute the instructions for receiving information from a user interface (UI) for a data request. The processor is further configured to execute the instructions for assigning identification information to the data request. The processor is further configured to execute the instructions for storing the data request in association with the identification information. The processor is further configured to execute the instructions for transmitting the data request to a vehicle. The processor is further configured to execute the instructions for receiving data from a source the vehicle in response to the transmitted data request. The processor is further configured to execute the instructions for notifying a user of the received data. In some embodiments, the processor is further configured to execute the instructions for identifying the vehicle to receive the data request based on the data request. In some embodiments, the processor is further configured to execute the instructions for determining a priority level of the data request received from the UI. In some embodiments, the processor is further configured to execute the instructions for determining the priority level of the data request based on payment information received from the UI. In some embodiments, the processor is further configured to execute the instructions for limiting access to a sensor in the vehicle based on a determined identity of the user. In some embodiments, the processor is further configured to execute the instructions for updating a status of the data request in response to transmitting the data request to the vehicle; and instructing the UI to provide a status of the data request to the user. In some embodiments, the processor is further configured to execute instructions for updating a status of the data request in response to receiving sensor data from the vehicle; and instructing the UI to provide a status of the data request to the user. In some embodiments, the processor is further configured to execute the instructions for transmitting the received sensor data to the user along with the notification to the user. In some embodiments, the processor is further configured to execute the instructions for permitting the user to access the received sensor data in response to transmitting the notification to the user of the received sensor data.

An aspect of this description relates to a method. The method includes receiving information from a user interface (UI) for a data request. The method further includes assigning identification information to the data request. The method further includes storing the data request in association with the identification information. The method further includes transmitting the data request to a vehicle. The method further includes receiving data from a source the vehicle in response to the transmitted data request. The method further includes notifying a user of the received data. In some embodiments, the method further includes identifying the vehicle to receive the data request based on the data request. In some embodiments, the method further includes determining a priority level of the data request received from the UI. In some embodiments, the method further includes determining the priority level of the data request comprises determining the priority level of the data request based on payment information received from the UI. In some embodiments, the method further includes limiting access to a sensor in the vehicle based on a determined identity of the user. In some embodiments, the method further includes updating a status of the data request in response to transmitting the data request to the vehicle; and instructing the UI to provide a status of the data request to the user. In some embodiments, the method further includes updating a status of the data request in response to receiving sensor data from the vehicle; and instructing the UI to provide a status of the data request to the user. In some embodiments, the method further includes transmitting the received sensor data to the user along with the notification to the user. In some embodiments, the method further includes permitting the user to access the received sensor data in response to transmitting the notification to the user of the received sensor data.

An aspect of this description relates to a system. The system includes a sensor. The system further includes a non-transitory computer readable medium configured to store instructions thereon. The system further includes a processor connected to the non-transitory computer readable medium. The processor is configured to execute the instructions for receiving a data request based on information received from a user, wherein the data request comprises trigger event information. The processor is further configured to execute the instructions for determining whether a trigger event indicated by the trigger event information has occurred based on an application stored on the non-transitory computer readable medium. The processor is further configured to execute the instructions for compiling data from the sensor in response to a determination that the trigger event has occurred, wherein a time period of the complied data prior to the trigger event and after the trigger event is based on the received data request. The processor is further configured to execute the instructions for instructing a first transmitter to transmit an indication that the trigger event has occurred to a server. The processor is further configured to execute the instructions for instructing a second transmitter to transmit the complied data to the server. In some embodiments, the system further includes a vehicle, wherein the sensor is attached to the vehicle.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system comprising:

a non-transitory computer readable medium configured to store instructions thereon; and a processor connected to the non-transitory computer readable medium, wherein the processor is configured to execute the instructions for:

receiving information from a user interface (UI) for a data request which specifies a source of the data to be collected, wherein the data request includes:

a trigger event for data collection, identification of data to be captured from at least one sensor within a vehicle; and a data collection duration from a first time prior to the trigger event to a second time after the trigger event;

assigning identification information to the data request;

storing the data request in association with the identification information;

transmitting the data request to the vehicle;

an abstractor configured to abstract the data request so that the data request is independent of a communication protocol and the UI, wherein the processor is further configured to execute the instructions for:

receiving a payload and a notification of detection of the trigger event, different from the payload, from the source in the vehicle in response to detecting of the trigger event of the transmitted data request, wherein the received payload is less than an entirety of data requested by the transmitted data request, and the received data includes information indicating what portions of the data request are not satisfied by the received payload; and notifying a user of the received detection of the trigger event.

2. The system according to claim 1, wherein the processor is further configured to execute the instructions for identifying the vehicle to receive the data request based on the data request.

3. The system according to claim 1, wherein the processor is further configured to execute the instructions for determining a priority level of the data request received from the UI.

4. The system according to claim 3, wherein the processor is further configured to execute the instructions for determining the priority level of the data request based on payment information received from the UI.

5. The system according to claim 1, wherein the processor is further configured to execute the instructions for limiting access to a sensor in the vehicle based on a determined identity of the user, and limiting the access to the sensor causes receiving less than the entirety of the data requested by the transmitted data request.

6. The system according to claim 1, wherein the processor is further configured to execute the instructions for: updating a status of the data request in response to transmitting the data request to the vehicle; and instructing the UI to provide a status of the data request to the user.

7. The system according to claim 1, wherein the processor is further configured to execute instructions for: updating a status of the data request in response to receiving sensor data from the vehicle; and instructing the UI to provide a status of the data request to the user.

8. The system according to claim 1, wherein the data request further includes a request for data from a software application operating in the vehicle, and the software application is external to all sensors in the vehicle.

9. The system according to claim 1, wherein the processor is further configured to execute the instructions for permitting the user to access the received data in response to transmitting the notification to the user of the received data.

10. A method comprising:

receiving information from a user interface (UI) for a data request, wherein the data request includes:

a trigger event for data collection, identification of data to be captured from at least one sensor within a vehicle; and a data collection duration from a first time prior to the trigger event to a second time after the trigger event;

assigning identification information to the data request;

storing the data request in association with the identification information;

transmitting the data request to the vehicle;

abstracting the data request so that the data request is independent of a communication protocol and the UI;

receiving a payload and a notification of detection of the trigger event, different from the payload, from the source in the vehicle in response to detecting of the trigger event of the transmitted data request, wherein the received payload is less than an entirety of data requested by the transmitted data request, and the received data includes information indicating what portions of the data request are not satisfied by the received payload; and notifying a user of the received detection of the trigger event.

11. The method according to claim 10, further comprising identifying the vehicle to receive the data request based on the data request.

12. The method according to claim 10, further comprising determining a priority level of the data request received from the UI.

13. The method according to claim 12, wherein determining the priority level of the data request comprises determining the priority level of the data request based on payment information received from the UI.

14. The method according to claim 10, further comprising limiting access to a sensor in the vehicle based on a determined identity of the user, and limiting the access to the sensor causes receiving less than the entirety of the data requested by the transmitted data request.

15. The method according to claim 10, further comprising: updating a status of the data request in response to transmitting the data request to the vehicle; and instructing the UI to provide a status of the data request to the user.

16. The method according to claim 10, further comprising: updating a status of the data request in response to receiving sensor data from the vehicle; and instructing the UI to provide a status of the data request to the user.

17. The method according to claim 10, further comprising transmitting the received data to the user along with the notification to the user.

18. The method according to claim 10, further comprising permitting the user to access the received data in response to transmitting the notification to the user of the received data.

19. A system comprising:

a non-transitory computer readable medium configured to store instructions thereon; and a processor connected to the non-transitory computer readable medium, wherein the processor is configured to execute the instructions for:

receiving information from a user interface (UI) for a data request, wherein the data request includes:

a first request for data from a software application operating in a vehicle, and the software application is external to all sensors in the vehicle;

a second request for data to be captured from at least one sensor within the vehicle; and a trigger event for initiating data collection corresponding to the first request and the second request, wherein the trigger event includes an improper operation of the software application;

assigning identification information to the data request;

storing the data request in association with the identification information;

transmitting the data request to the vehicle;

an abstractor configured to abstract the data request so that the data request is independent of a communication protocol and the UI, wherein the processor is further configured to execute the instructions for:

receiving a payload and a notification of detection of the trigger event, different from the payload, from at least one of the software application or the at least one sensor in response to detecting of the trigger event of the transmitted data request, wherein the received payload is less than an entirety of data requested by the first request and the second request; and notifying a user of the received detection of the trigger event.

20. The system of claim 19, wherein the data request further includes: a data collection duration from a first time prior to the trigger event to a second time after the trigger event.

* * * * *